Oct. 3, 1933.  A. S. FITZ GERALD  1,929,059
ELECTRIC FAULT RESPONSIVE APPARATUS
Filed Dec. 17, 1931  3 Sheets-Sheet 3

INVENTOR.
Alan S. FitzGerald

Patented Oct. 3, 1933

1,929,059

UNITED STATES PATENT OFFICE 1,929,059

ELECTRIC FAULT RESPONSIVE APPARATUS

Alan S. Fitz Gerald, Wynnewood, Pa.

Application December 17, 1931
Serial No. 581,613

15 Claims. (Cl. 175—294)

My invention relates to electric fault responsive or protective relay systems intended to control the operation of disconnecting means, such as circuit breakers and the like, in response to the occurrence of abnormal conditions on an electric power system.

More particularly my invention relates to protective relay systems adapted to be responsive to unbalance conditions of the phases of a polyphase electric power system.

Various electric protective relay systems have been proposed in the past intended to cause disconnection of sections of an electric power network on which faults may occur. Such systems, in order to achieve successful operation, must not only effect tripping of the circuit breakers, on the occurrence of a fault, by means of which the faulty section may be disconnected from the system, but must, with equal certainty, avoid the operation of circuit breakers controlling other sections, which have not suffered a fault, but which, as a result of a fault on some other portion of the power network, may be subjected to abnormal currents.

It has been found, more particularly in the case of systems of considerable extent, carrying very large amounts of power, that the occurrence of faults, and the resulting automatic operation of circuit breakers involving abrupt changes in load conditions, may give rise to conditions of instability, characterized by a tendency of synchronous apparatus to fall out of step and resulting in the pulsating flow of currents through portions of the network which have not suffered faults. Such currents, however, often attain magnitudes of the order of fault currents and may be accompanied by pulsating alternations in the direction of the flow of power.

Difficulty has frequently been encountered in preventing the incorrect operation of protective relay systems when such conditions occur, although such systems will function correctly without difficulty so long as the power system remains in a condition of stability. One method of avoiding this difficulty, largely resorted to in the past, has been to provide the protective relays with such time delay features as will prevent their operation by reason of transient pulsations. It has more recently been appreciated, however, that delay in removing electrical faults from a power network is a major contributing cause to the occurrence of conditions of instability, and, at the present time, to an increasing extent, substantially instantaneous operation is demanded of a protective relay system.

It is, therefore, apparent that, in order to secure a completely effective relay system means must be found which will distinguish between currents directly resulting from faults, and currents, of similar magnitude, which are due to conditions of instability.

A distinguishing characteristic of fault currents, in comparison with effects due to instability, is that the former are, almost exclusively, either faults to ground, or faults between two phases. Excess currents arising from instability, on the other hand, more usually affect all three phases.

It has, therefore, been proposed to overcome the difficulty cited above by providing fault responsive relays adapted to distinguish between flow of current in an abnormal manner resulting from actual faults, or break down of insulation, and currents merely of abnormal magnitude caused by instability. Relays actuated in accordance with departure from normal conditions of balance, or symmetry of the electrical conditions in the respective phases of a three phase system, have been suggested to accomplish this result.

Conditions of instability usually result in heavy, balanced, three phase currents. Ground faults and faults between two phases result in pronounced out-of-balance effects. Balanced three phase faults are extremely rare. Faults between all three conductors of a transmission line undoubtedly occur sometimes. But, more often, the initial cause thereof is a ground or a fault between two phases, spreading, later, as a result of the power arc, to the third phase and, if the fault be promptly disconnected in its initial condition, by fast operating relays actuated by the out-of-balance effect, the three phase fault condition will not be reached. A completely balanced three phase fault may, of course, result from a switching mistake. This occurrence, however, can readily be prevented by suitable interlocking of switchgear, which procedure is to be preferred to the provision of relays for dealing with the fault after it has occurred.

According to the theory of symmetrical components, relays which operate on the principle of phase unbalance are said to be actuated in accordance with the negative phase sequence component of the fault currents.

Two classes of apparatus have been available for furnishing operation in accordance with the extent to which lack of balance may exist between the three phases. First, there have been various types of electro-mechanical devices or relays which are actuated by the sum or difference of a plurality of electro-magnetic forces produced by the three phase currents. Second, there have been arrangements of capacity, reactance, and resistance, in the form of networks designed to produce phase shift effects by means of which a resultant alternating current electrical output is provided which may be related to one of the symmetrical components of the three phase currents.

Apparatus of the former type is limited in its application by the fact that, by its inherent nature, its function can only be carried out through the agency of mechanical movement. It is, therefore, limited to the closing of contacts and cannot provide an electrical effect dependent upon the magnitude of the out-of-balance effect. Furthermore, modern requirements, in connection with relay systems for important power networks, demand the maximum possible speed of operation of the protective relay devices. The presence of moving parts, possessing inertia and elasticity, and which must be displaced through a certain distance in order to actuate contact making means, sets certain definite limits to the maximum speed of action at which certainty of correct operation and freedom of incorrect action is attainable.

Apparatus of the second class has certain disadvantages which have precluded the extensive application of symmetrical component networks to electric protective relay systems. Relay devices in general are energized from current transformers, usually of the bushing transformer type. The power available in the secondary circuit is, therefore, subject to limitations. A feature of the network arrangements used for furnishing energy to relays, in accordance with a symmetrical component, is that they are wasteful of power by reason of the essential use of resistance elements carrying an appreciable portion of the total power available in order to produce the phase shift which is necessary. The voltampere burden imposed upon the current transformer is therefore excessive.

The output must be small in relation to the power spent in the network if the latter is to be accurate in its operation, thus the power available for relay operation is severely restricted. The effect of these circumstances is that fault currents of considerable magnitude are necessary in order to operate the relay device. In addition, the relative values of the resistance, capacity and reactance elements in the network are critical. In order to produce the proper phase shift effect, accuracy is required of the order associated with resonant circuits. It is difficult to furnish reactances and resistances, that will not undergo some change in value over the wide range of current magnitude embraced by fault currents, which are not unduly costly. Moreover, such networks impose unbalanced loads upon the current and potential transformers.

It is an object of my invention, therefore, to provide an improved electric fault responsive system, of the type actuated by unbalance between the phases of a polyphase system, which may be carried into effect without any moving apparatus or parts, and which in consequence, is especially adapted to high speed actuation of circuit disconnecting means.

It is a further object of my invention to provide an electric protective arrangement of the type specified, which shall not be dependent for its correct action upon exact phase relation effects requiring critical values for the various circuit constants, and which shall be simple, economical, shall make efficient use of the power furnished by the current transformers, shall not impose a high burden upon the latter, and shall be capable of correct action at more than one frequency.

It is a further object of my invention to provide a phase unbalance electric fault responsive system particularly adapted instantaneously to control the operation of electron discharge devices or systems such as carrier current means for controlling remote circuit breakers and the like, or directly to control vapor electric current conducting or interrupting means.

It is a still further object of my invention to provide an electric fault-responsive system which shall not be limited to the initiation of a mechanical control action such as is represented by the closing of a relay contact, but which, in addition shall be capable of furnishing an electrical effect related in magnitude to the phase unbalance effect and which, in consequence, is adapted to co-operate with other electric protective apparatus to control or modify the action thereof in accordance with the condition of balance between the phases of a poly-phase electric power system.

The novel features which I consider characteristic of my invention are set forth with particularity in the appended claims. The invention itself, however, both as to its organization and its method of operation, together with the additional objects and advantages thereof, will best be understood from the following description of a specific embodiment when read in connection with the accompanying drawings in which:

Figure 1:
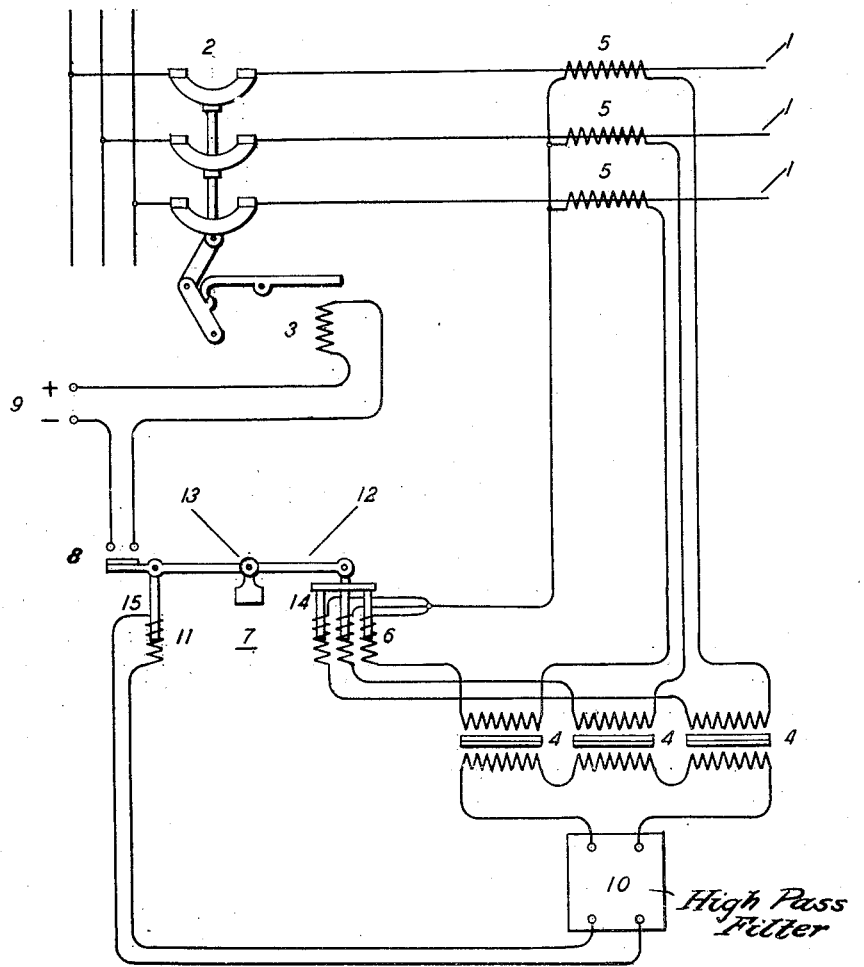
Fig. 1 is a diagrammatic representation of a portion of a power network including an embodiment of my invention.

Referring now to the embodiment of my invention shown in Fig. 1, the conductors 1 of a three phase circuit are provided with circuit controlling means such as circuit interruptors 2 having a trip coil 3. These interruptors are arranged to be controlled, according to my invention, by apparatus responsive to lack of balance between the three phase currents flowing in the conductors 1.

The apparatus for accomplishing this result consists of saturable transformers 4 energized by current transformers 5 associated with the conductors 1, in series with the windings 6 of a relay 7 having contacts 8 adapted to complete a circuit from a source 9 to the trip coil 3 of the interruptors 2.

The secondary windings of the saturable transformers 4 are connected in series with an electric filter circuit 10 to energize a restraining winding 11 of the relay 7. The filter 10 may be of any suitable type well known to those skilled in the art and should have such characteristics that no appreciable energy of the frequency of the power flowing in conductors 1 is transmitted by the filter 10 to the winding 11, but only energy of three times the power frequency is permitted by the filter to energize the restraining winding 11.

The relay 7 may be of the induction disc pattern or of any other suitable type which is adapted to be operated by one electrical effect and to be restrained from operating by a second electrical effect. As shown in Fig. 1, by way of illustration, the relay 7 has a movable system 12 pivoted at 13, having plungers 14 operatively associated with windings 6 and a further plunger 15 operatively associated with the restraining winding 11.

In the present specification arrangements intended to be primarily responsive to faults between phases are described. The circuits shown are not provided for the purpose of being actuated by ground faults. Ground fault responsive arrangements are not, in general, affected by inter-phase faults, whether or not these be balanced; therefore it is unnecessary to include ground fault devices in the present specification. It will, however, be obvious to those skilled in the art, that a ground fault responsive device may be included in the residual connection from the current transformers 5 in any of the figures accompanying the specification, and that such ground fault apparatus will not necessarily affect, or be affected by, the operation of the devices comprising my invention.

The principle of operation of my invention is based upon the generation of third harmonic currents by a saturating transformer, and in particular, with the phase relations of the third harmonic currents under balanced and unbalanced conditions, respectively in a three phase circuit.

If, now, it be assumed that balanced three phase currents flow in the conductors 1 the secondary currents of the transformers 5 will be displaced symmetrically in accordance with the normal conditions on a three phase circuit. Thus the currents energizing the transformers 4 will be displaced in phase by 120 degrees. These currents will energize the windings 6 of the relay 7 and will tend to close the contacts 8 at the same time saturating the transformers 4. Current, both of the power frequency and the third harmonic thereof will tend to flow in the individual secondary windings of the transformers 4.

Considering now the closed circuit including the secondary windings of the transformers 4, connected in series with the filter 10 the following conditions will be noted. Assuming that no ground current is carried by the conductors 1, the resultant current of the power frequency which will flow in the closed circuit, will be zero. Due to saturation of the transformers 4 each transformer will tend to set up current of three times the power frequency. Since the power frequency currents are displaced 120 degrees in phase, third harmonic currents in all three of the transformers 4 will be in phase co-incidence and will be cumulative. Thus the total energy, at the third harmonic frequency, of three times the harmonic output of each single transformer 4, being transmitted by the filter 10, will energize winding 11 and will exert a restraining force on the plunger 15 tending to hold in the open position the contacts 8. The turns of the windings 6 and 11, respectively, may be so proportioned that when the three phase currents in the conductors 1 are in exactly symmetrical phase relation, the restraining effect of the winding 11 is sufficient to prevent operation of the relay 7.

If it be so desired, very heavy balanced currents may be arranged to operate the relay by suitable design of the magnetic circuits of the relay so that the effect of windings 6 shall increase at a greater rate than the effect of the winding 11 by permitting saturation of the magnetic circuit associated with the winding 11 and the plunger 15 in a manner which is well known to those skilled in the art.

Now let it be supposed that a fault occur between any two of the conductors 1, or on another portion of the power system which may cause corresponding currents to flow in two of the conductors 1. This will energize two of the transformers 4 and two of the windings 6. The pull on the plungers 14 tending to close the contacts 8 will be in accordance with the magnitudes of the currents in conductors 1. The two transformers 4, therefore, will saturate and each will tend to set up third harmonic energy in the secondary circuit. Under this condition, however, the currents flowing in the conductors 1 will be displaced in phase, not 120 degrees, but 180 degrees. Thus the triple frequency currents, as well as the power frequency currents, will be in phase opposition. Accordingly the resultant triple frequency energy in the closed circuit comprising the secondary windings of transformers 4, the filter 10 and the restraining winding 11 will approximate to zero, and no substantial energization of the winding 11 will result. No effective restraining effort will be exerted on the plunger 15 and the relay 7 will close contacts 8, completing the circuit to the trip coil 3 and thereby operating the interruptors 2.

The triple frequency filter 10 may be a simple resonant filter if the fault responsive system comprising the present invention is only required to operate around one frequency. The system may be made operable, however, at more than one frequency by employing other types of filter known to those skilled in the art, such as, for example, the type known as a "high pass" filter.

While I have shown the transformers 4 and the current transformers 5 connected in star it will be obvious to those skilled in the art that either or both may be connected in delta.

Figure 2:
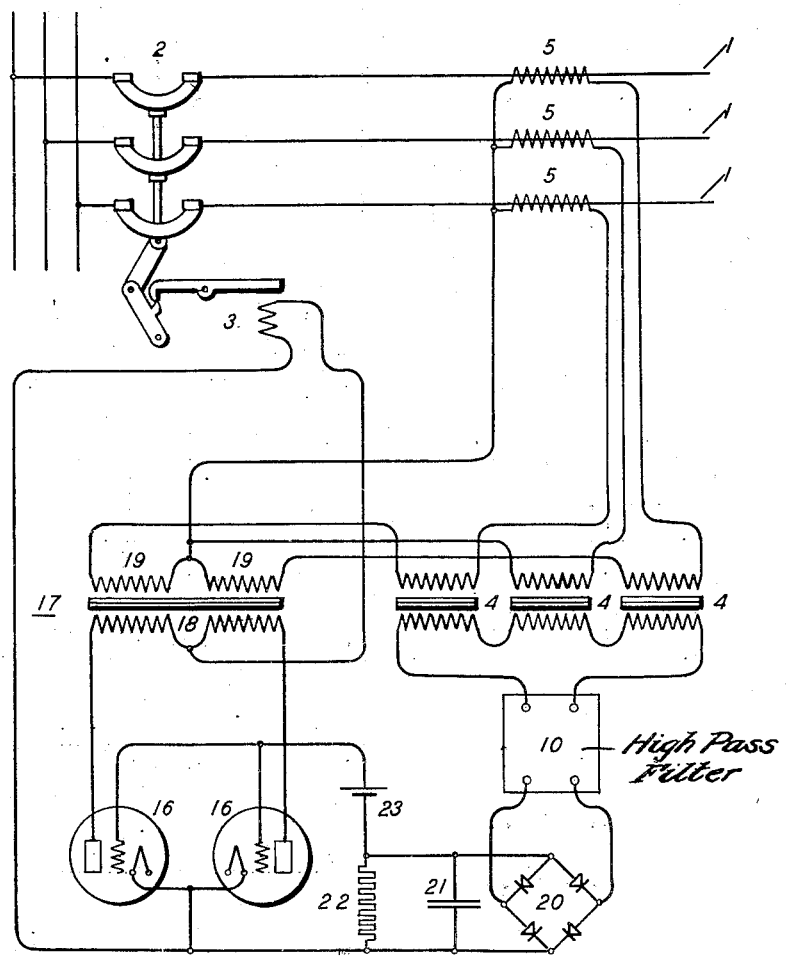
Fig. 2 is a diagrammatic representation, analogous to Fig. 1, showing an embodiment of my invention adapted to control electron discharge devices.

In Fig. 2 I show a further embodiment of my invention adapted to control the operation of electron discharge devices of the type controllable in accordance with the voltage applied to a control electrode or grid.

In Fig. 2 like numerals are employed to designate the power conductors 1, the circuit interruptors 2, the trip coil 3, the saturating transformers 4, the current transformers 5, and the triple frequency filter 10, all as described in reference to Fig. 1. In place of the relay 7 in Fig. 1 I employ in the system shown in Fig. 2 a pair of electron discharge devices 16 which may be of the high vacuum type.

The anode circuit of the devices 16 is energized by means of a transformer 17 having a secondary winding 18 and two primary windings 19 energized by the secondary currents of the current transformers 5 in series with the primary windings of two of the saturating transformers 4. The trip coil 3 is connected in series with the anode circuit of the electron discharge devices 16 so as to receive rectified current from the latter. The triple frequency output of the filter 10 is rectified by means of a rectifier 20 and the rectified current, smoothed if desired by means of the condenser 21 is constrained to flow in a voltage drop producing means, such as the resistor 22, in such a direction as to cause the upper extremity of the resistor 22 to assume a negative potential relative to the lower end. The control electrodes of the electron discharge devices 16 are connected to the upper extremity of the resistor 22 and the cathodes are connected to the lower end. A source of positive bias voltage 23 may be included in the circuit connecting the control electrodes to the resistor 22.

When balanced three phase currents are flowing in the conductors 1 current from the secondary windings of the current transformers 5 energizes the three saturating transformers 4 and both of the primary windings 19 of the transformer 17, thus applying anode voltage to the electron discharge devices 16. Under this condition, however, triple frequency energy, as explained in connection with Fig. 1, is set up cumulatively in the secondary windings of the transformers 4. This third harmonic energy is transmitted by the filter 10 to the rectifier 20. The rectified triple frequency current flowing in the resistor 22 causes a voltage drop across the latter, which, being connected as shown, to the grids of the electron discharge devices 16 applies a negative voltage between the grids and the cathodes of the devices 16, which, accordingly do not conduct and no current flows in the trip coil 3.

If now a fault between any two phases causes unbalanced currents to flow in two of the conductors 1 corresponding secondary currents will energize two of the transformers 4 and either one or both of the primary windings 19 of the transformer 17 thus saturating two of the transformers 4 and causing anode voltage to be applied to the electron discharge devices 16. As described with reference to Fig. 1, since the currents energizing the transformers 4 will be 180 degrees displaced in phase, the triple frequency energy due to saturation will likewise be in phase opposition. Thus substantially no voltage will be set up across the resistor 22 and in consequence no effective negative voltage will be applied between the grids and cathodes of the electron discharge devices 16. Accordingly current will flow in devices 16 energizing the trip coil 3 and actuating the interruptors 2, thereby disconnecting the conductors 1 from the power system.

If desired, three or more devices 16 may be employed, and may be energized by transforming means associated with each of the three current transformers 5 in accordance with methods of connection, well known in the art, for polyphase rectifying arrangements.

While I have shown, by way of illustration, electron discharge devices 16 of the type controllable in accordance with the magnitude of the voltage applied between control electrode and cathode, it should be clearly understood that my invention may with equal facility, be applied in connection with vapor electric devices controllable by means of phase shift between grid and anode voltages. In order to furnish this type of control the output of the rectifier 20 is applied to any suitable phase shift network or device adapted to furnish a phase shift in accordance with a variable direct current or voltage. For example I may use the vapor electric phase shift control arrangement described by me in "electronics" for January 1931 and illustrated in Fig. 2 on page 467. Such an arrangement will produce a phase shift effect which will vary in accordance with the output of the rectifier 20 and which therefore will be dependent upon the balance of the currents in conductors 1. In this manner vapor electric devices controllable by phase shift methods may be employed in place of the interruptors 2 and may directly be controlled so as to interrupt the current in conductors 1 on the occurrence of unbalanced conditions.

In the foregoing diagrams and specification I have shown and described means responsive to the out-of-balance of a three phase circuit whereby a circuit breaker or other electrically operated device may be actuated when a predetermined amount of phase unbalancing exists. I have pointed out in the preliminary description of this invention how excess currents due to system instability may be distinguished from fault currents on account of the fact that the former are usually balanced three phase currents whereas the latter are almost invariably accompanied by a certain amount of out-of-balance effect.

The presence of unbalanced currents flowing in any given portion of a power network such as a transmission line, is not, however, an indication that the said transmission line is itself subject to an electrical fault, nor is it an indication that the transmission line should be disconnected. The line may be carrying out-of-balance currents flowing towards a fault on some other portion of the power system, and it should be held in service, the fault being eliminated from the system by the action of circuit breakers controlling the part of the power network in which the trouble has occurred.

Many different relay systems have been devised for the purpose of discriminating under these conditions, so that only the faulty line may be disconnected, and other portions of the network be free from interruption. These operate according to several well-known principles such as parallel line current balance, power directional relays, distance or impedance relays, and means for effecting the disconnection or the retention of a transmission line in accordance with the relation between the power conditions at the two extremities of the line, carrier current or like means being provided for effecting comparison between the conditions at the two ends to effect disconnection of the line only if the line itself has suffered a fault.

All of these systems, unless restricted to ground faults only, if they are effective for faults between any two phases, are likewise affected by three phase currents. Thus they are subject to energization by all excess current which may flow, in the portion of the power system embraced by the protective relay system, due to transient instability of synchronous machinery connected to the power system. As I have indicated in the foregoing description, this element of disturbance adds very greatly to the difficulty of securing one hundred per cent successful relaying on a power system. Many of the existing relay systems would discriminate with greater precision and would operate with much greater success if they might be relieved therefrom. That is, if they be made responsive to all faults between two phases only, or to unbalanced three phase faults, but not responsive to balanced three phase currents; or responsive to the latter to a reduced extent. In some instances means have not been known, in the past by which this operating feature may be incorporated in the design or construction of the relays. In other cases it has not been convenient to introduce additional features into the relay structure to achieve this result.

Figure 3:
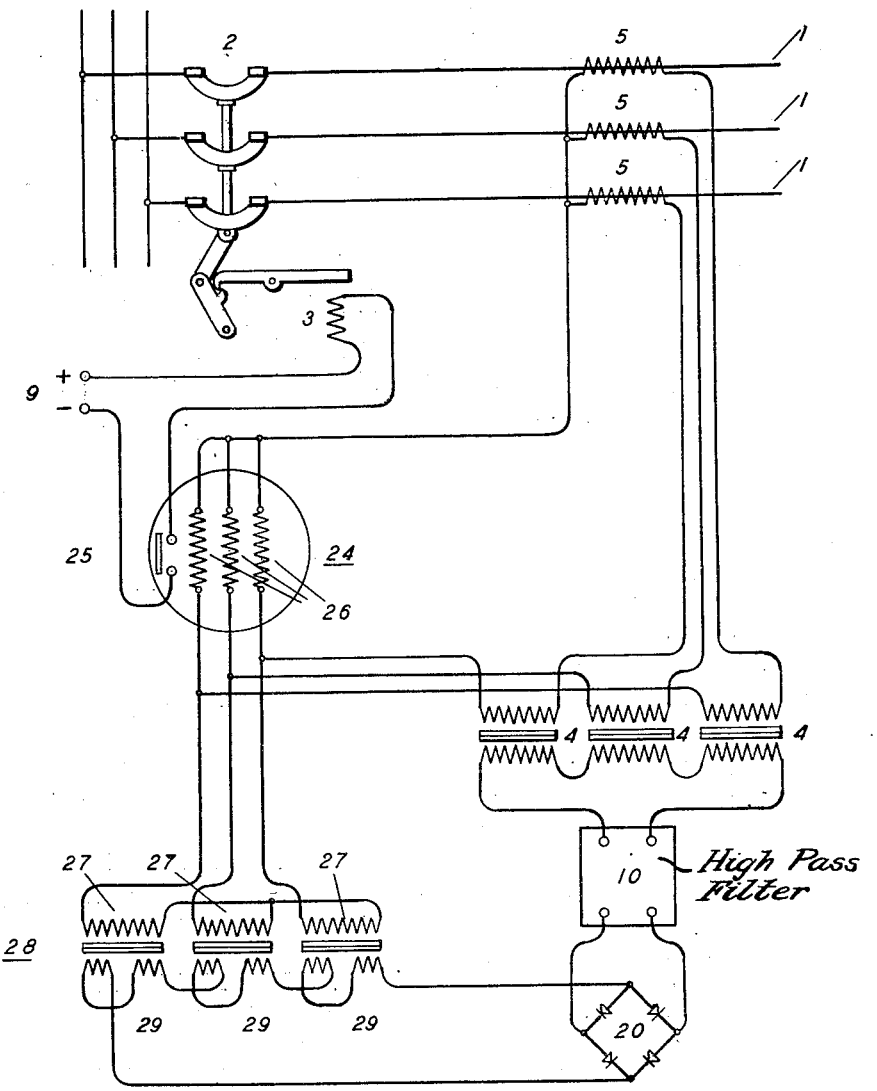
Fig. 3 is a representation of a further embodiment of my invention adapted to control the energization of other electric fault responsive or protective apparatus in accordance with phase unbalance.

According to another modification of my invention shown in Fig. 3 I provide apparatus, free from moving parts, which may be used in conjunction with any known or existing selective relay system responsive to all forms of faults between phases, without any structural change or other modification of the said relay system, by means of which the energization of the relays may be permitted only on the occurrence of faults giving rise to out-of-balance effects, and may be prevented, in the case of excess currents which are balanced in the three phases; or may be permitted in the latter case at reduced intensity. It is understood that any such relay arrangement may, in addition, be operative in the case of ground faults and that the additional features represented by my invention as shown in Fig. 3 will have no effect thereon since ground fault relays or systems are not, in general, affected by three phase or other inter-phase effects.

In Fig. 3 I show conductors 1, circuit interruptors 2, trip coil 3, saturating transformers 4, current transformers 5, source 9, filter 10 and rectifier 20 all as described in reference to Fig. 2. Any existing type of relay or protective system is represented by the device 24, having contacts 25 and inter-phase windings 26. It may also have a ground fault protection element, not shown in the diagram. The device 24 may represent for example, a power directional relay, a distance relay, or a carrier current relay system such as is described in Patent No. 1,797,976. Only essential current windings are indicated in the diagram, all potential windings or other auxiliary connections which are not inter-connected with the arrangements included in the present invention being omitted in the diagram for the sake of clearness.

The windings 26 are energized from the current transformers 5 in series with the saturating transformers 4 as shown in the diagram. In parallel with the windings 26 of the protective relay 24 I connect the impedance windings 27 of saturating reactors 28 having direct current saturating windings 29. The saturating windings 29 are energized from the rectifier 20. It will be recalled that, as explained in reference to Fig. 2, rectified current is furnished by the rectifier 20 only when the conductors 1 are carrying balanced currents. When the conductors 1 are carrying single phase short circuit currents, substantially no triple frequency current energy, from the saturating transformers 4 and filter 10 energize the rectifier 20 and substantially no rectified current is furnished, under this condition, by the rectifier 20 to the saturating windings 29 of the saturating reactors 28. The impedance windings 27, being in shunt with the windings 26 of the protective relay 24, the current from the current transformers 5 divides between the windings 26 and the windings 27 in accordance with their respective impedances. Thus, when the reactors 28 are not saturated, windings 27 may have a high impedance and substantially all of the current from the current transformers 5 may flow in the windings 26 of the protective relay 24. On the other hand, when the reactor 28 is saturated substantially all of the current from the current transformers 5, or, if desired, a suitable proportion thereof, is diverted from the windings 26, the major portion of the current flowing in the windings 27.

The reactors 28, being excited from the rectifier 20, will be saturated when the conductors 1 are carrying three phase balanced currents. Thus, under this condition the protective relay 24 will not be energized, or will be energized to a reduced extent. It will not, therefore, be responsive, or will be responsive to a reduced extent, to balance three phase currents. When, however, the conductors 1 carry currents caused by a fault between any two phases, the reactors 28 will not be saturated. The windings 27 will present a high impedance to the current from the current transformers 5 substantially all of which will flow in the windings 26. Thus under these circumstances the relay 24 will be fully energized and will be responsive to the maximum extent to this fault condition.

It will be apparent to those skilled in the art that various means other than the saturating reactors 28 may be employed for the purpose of controlling the sensitivity of the device 24 in accordance with the presence, or absence of the triple frequency energy, either directly or through the agency of the rectifier 20, without departing from the spirit of my invention. For example I may use electron discharge or vapor electric devices as variable impedances in place of saturating reactors. Obviously if minor modifications in the structure of the device 24 be permissible I may provide the latter with preventing means such as a holding coil (not shown) energized in accordance with the triple frequency energy furnished when three phase balanced currents flow, after the manner of Fig. 1.

My invention, since it is capable of being carried out, in its entirety, by means of apparatus free from contacts and moving parts is especially adapted to co-operate with a carrier current protective relay system such as that described in Patent No. 1,797,976, an object of which is to secure high speed selective relay action.

It will be apparent to those skilled in the art that difficulty would be encountered in applying modifying means, to furnish selective action in accordance with conditions of balance, involving contacts and moving parts, on account of the fact that, unlike other protective systems, which, in general, consist of apparatus at a single location, to perform a desired function, the carrier current system comprises a plurality of installations separated by a considerable distance. The action of the two sets of apparatus, nevertheless, must at all times be co-ordinated. Thus any modifying effect applied at one location, must be similarly applied, with exact chronological correspondence, at the other location. Otherwise, during a through fault, incorrect operation might be possible. In view of the fact that under fault conditions rapid fluctuations and transient excess current effects are set up, exact synchronization, at both extremities of the protected section, of any modifying action is essential. It is well known that under such conditions the usual types of electro-mechanical device is affected by phenomena of inertia and elasticity associated with its moving parts, contacts, stops, etc. At ordinary speeds of response such devices, if applied to modify the action of a carrier current system, might be satisfactory. At the high speed of response which is desired in the case of a carrier current system the effects, described above, are of such an order that exact synchronization, of two independent devices, at different locations, in response to power conditions affecting both installations in a like manner, cannot be relied upon during system disturbances. For a high speed selective relay system exact synchronization is of paramount importance, and only by such a system as that embodied in my present invention, in which all contacts and moving elements are eliminated, may the desired result be achieved.

My invention may be applied to the system described in Patent No. 1,797,976 by employing a system of connection substantially as shown in Fig. 3 of the present specification, the device 24 representing the carrier current system. Thus the windings 26 represent all of the excitation windings of the carrier current system and the contacts 25 represent the completion of the continuity, in the carrier current system, whereby the trip coil is energized to disconnect the portion of the network embraced by the protective system, from the power system, under the appropriate fault conditions.

Although I have chosen certain specific embodiments of my invention for illustration many modifications thereof are possible and will be apparent to those skilled in the art to which it pertains. My invention, therefore, is not to be limited except insofar as is necessitated by the prior art and by the spirit of the appended claims.

I claim:

1. An electric fault responsive system for a polyphase circuit including circuit controlling means and multiple frequency means, energized from said circuit through a plurality of current transformers for effecting a circuit controlling action in action in accordance with an unbalanced condition of the polyphase currents in the said circuit.

2. An electric fault responsive system for a polyphase circuit including circuit controlling means and saturating multiple frequency means, energized from said circuit through a plurality of current transformers for effecting a circuit controlling action in accordance with an unbalanced condition of the polyphase currents in the said circuit.

3. An electric fault responsive system for a polyphase circuit including circuit controlling means and saturating triple frequency means energized from said circuit through a plurality of current transformers for effecting a circuit controlling action in accordance with an unbalanced condition of the polyphase currents in the said circuit.

4. The method of controlling circuit interrupting means in accordance with an unbalanced condition of the current in an electric circuit which comprises deriving triple frequency energy, due to a balanced condition of the current in the said electric circuit, and utilizing said triple frequency energy to cause a circuit controlling action.

5. The method of protecting a polyphase electric power circuit which comprises deriving from the current in the circuit an effect tending to cause an interruption in the continuity of the said circuit, deriving another effect in response to an harmonic of the power frequency current commingling said effects during a condition of balance in the power circuit to prevent interruption of the continuity thereof, and utilizing the departure from a pre-determined relation of said effects, resulting from a fault condition in the power circuit, to interrupt the continuity thereof.

6. In combination, a controlled circuit and an electric fault responsive system, operable at more than one frequency, including triple frequency means, energized from said circuit through a plurality of current transformers, for controlling said electric circuit in accordance with departure from balanced conditions of the phases of a polyphase electric circuit.

7. In combination with a polyphase electric circuit, an electric fault responsive system, comprising triple frequency means, energized from said circuit through a plurality of current transformers and circuit disconnecting means responsive to said triple frequency means, to interrupt the power in said circuit in the event of unbalanced currents in the phases thereof.

8. An electric fault responsive system for a polyphase electric circuit, including means for deriving triple frequency energy due to a balanced condition of the currents in said circuit, means responsive to an electrical condition of said circuit for actuating circuit disconnecting means, and means controlled by said triple frequency energy for preventing the actuation of the circuit disconnecting means when the currents in the phases of the said circuit are balanced.

9. An electric fault responsive system for a polyphase electric circuit, including an electro-responsive device energized in accordance with a condition of the said electric circuit, for actuating circuit disconnecting means, saturating transformers energized in accordance with the currents in the said circuit, for furnishing triple frequency energy under a balanced condition of the said circuit, filtering means for said triple frequency energy, and restraining means energized by said triple frequency energy to prevent the said electro-responsive device from actuating said circuit disconnecting means when the currents in the phases of the said circuit are balanced.

10. An electric fault responsive system for a polyphase circuit, including a plurality of electron discharge devices energized through a plurality of current transformers in accordance with an electrical condition of the said circuit, for controlling the action of circuit disconnecting means, saturating transformers furnishing triple frequency energy under a balanced condition of the said circuit, filtering means for said triple frequency energy, rectifying means for said filtered triple frequency energy, and means whereby said rectified energy controls the action of said electron discharge devices to permit actuation of the disconnecting means when the currents in the phases are unbalanced and to prevent actuation of the disconnecting means when the currents are balanced.

11. An electric fault responsive system for a polyphase circuit, including a plurality of electron discharge devices energized from said circuit through a plurality of current transformers, means whereby the space current in said devices may be utilized to control the power in said circuit and triple frequency means for controlling the action of said electron discharge devices in accordance with the condition of balance of the currents in the phases of said circuit.

12. In an electric fault responsive system for a polyphase power circuit, disconnecting means, an electro-responsive device actuated by a condition of the said power circuit, and restraining means associated with said electro-responsive device, actuated by triple frequency energy derived from a balanced condition of the currents in said power circuit, to oppose actuation of said electro-responsive device when said balanced condition obtains, the effect of said restraining means being such as to increase less rapidly than the effect tending to actuate said electro-responsive device so as to prevent the actuation of said electro-responsive device under a balanced condition of said power circuit, and to permit the actuation of said electro-responsive device under a balanced condition involving heavier currents.

13. An electric fault responsive system for a polyphase circuit including a plurality of space current devices adapted to control the power in said circuit in accordance with a condition of balance of said circuit, phase shift means for controlling the action of said space current devices, and triple frequency responsive means energized from said circuit through a plurality of current transformers for actuating said phase shifting means, the action of said triple frequency responsive means being dependent upon a condition of balance in the said power circuit.

14. In combination, an electric protective circuit responsive to inter-phase faults on a polyphase circuit, means responsive to phase unbalance conditions including saturating transformers energized through a plurality of current transformers furnishing triple frequency energy under balanced conditions of said circuit, filtering means for said triple frequency energy, and means controlled by said triple frequency energy for so modifying the operation of said protective system as to cause it to respond in a different manner, selectively, to polyphase balanced currents and to fault currents characterized by phase unbalance effects.

15. In combination, an electric protective system responsive to inter-phase faults on a polyphase circuit, means responsive to phase unbalance conditions, including saturating transformers energized through a plurality of current transformers furnishing triple frequency energy under balanced conditions of said circuit, filtering means for said triple frequency energy, rectifying means for rectifying said filtered triple frequency energy, and saturating means controlled by said rectified energy for so modifying the operation of said protective system as to cause it to respond in a different manner, selectively, to polyphase balanced currents and to fault currents characterized by phase unbalance effects.

ALAN S. FITZ GERALD.